(12) United States Patent
Dobronsky et al.

(10) Patent No.: US 8,661,349 B2
(45) Date of Patent: Feb. 25, 2014

(54) SYSTEM AND METHOD FOR THE DYNAMIC IMPROVEMENT OF INTERNET BROWSER NAVIGABILITY

(75) Inventors: Oren Dobronsky, New York, NY (US); Gabriella Karni, New York, NY (US)

(73) Assignee: Pinball Acquisition Corporation, Bellevue, WA (US)

( * ) Notice: Subject to any disclaimer, the term of this patent is extended or adjusted under 35 U.S.C. 154(b) by 1752 days.

(21) Appl. No.: 11/736,824

(22) Filed: Apr. 18, 2007

(65) Prior Publication Data

US 2007/0245246 A1 Oct. 18, 2007

Related U.S. Application Data

(63) Continuation of application No. 09/864,551, filed on May 23, 2001, now Pat. No. 7,222,303, which is a continuation-in-part of application No. 09/373,815, filed on Aug. 13, 1999, now Pat. No. 6,784,900.

(30) Foreign Application Priority Data

Jul. 15, 1999 (IL) .......................................... 130972

(51) Int. Cl.
G06F 3/00 (2006.01)

(52) U.S. Cl.
USPC ........................................................ 715/744

(58) Field of Classification Search
USPC .......................................... 715/744, 745, 747
See application file for complete search history.

(56) References Cited

U.S. PATENT DOCUMENTS

| 5,786,815 A | 7/1998 | Ford |
| 5,793,693 A | 8/1998 | Collins et al. |
| 5,796,393 A | 8/1998 | MacNaughton et al. |
| 5,818,446 A | 10/1998 | Bertram et al. |
| 5,818,447 A | 10/1998 | Wolf et al. |
| 5,850,548 A | 12/1998 | Williams |
| 5,875,296 A | 2/1999 | Shi et al. |
| 5,880,731 A | 3/1999 | Liles et al. |
| 5,901,313 A | 5/1999 | Wolf et al. |
| 5,923,885 A | 7/1999 | Johnson et al. |
| 5,932,885 A | 8/1999 | DeBellis et al. |
| 5,964,836 A | 10/1999 | Rowe et al. |
| 5,986,654 A | 11/1999 | Alexander et al. |

(Continued)

FOREIGN PATENT DOCUMENTS

| WO | WO 98/47080 | 10/1998 |
| WO | WO 00/25239 | 5/2000 |

(Continued)

OTHER PUBLICATIONS

Stardock Press Release (Stardock Announces WindowBlinds, version 0.80, Mar. 24, 1999), 2 pages.

(Continued)

Primary Examiner — Thanh Vu
(74) Attorney, Agent, or Firm — Rutan & Tucker, LLP (57) ABSTRACT

A method and system for dynamically providing the on-demand addition of graphic and other information to a web browser's toolbar. The HotbarToolbar comprises a plurality of categorized or rated links, which in the presently preferred embodiment are organized under customized, newly and dynamically added toolbar buttons known as hotbuttons. The name and/or content of the hotbuttons may change dynamically in accordance with various factors (including, but not limited to, changes in URL).

21 Claims, 7 Drawing Sheets

(56) References Cited

U.S. PATENT DOCUMENTS

| | | | |
|---|---|---|---|
| 5,999,179 | A | 12/1999 | Kekic et al. |
| 5,999,973 | A | 12/1999 | Glitho et al. |
| 6,028,997 | A | 2/2000 | Leymann et al. |
| 6,034,681 | A | 3/2000 | Miller et al. |
| 6,041,360 | A | 3/2000 | Himmel et al. |
| 6,054,987 | A | 4/2000 | Richardson |
| 6,059,842 | A | 5/2000 | Dumarot et al. |
| 6,064,383 | A | 5/2000 | Skelly |
| 6,091,411 | A | 7/2000 | Straub et al. |
| 6,104,397 | A | 8/2000 | Ryan et al. |
| 6,121,967 | A | 9/2000 | Foster et al. |
| 6,133,915 | A | 10/2000 | Arcuri et al. |
| 6,141,010 | A | 10/2000 | Hoyle |
| 6,148,346 | A | 11/2000 | Hanson |
| 6,175,363 | B1 | 1/2001 | Williams et al. |
| 6,188,403 | B1 | 2/2001 | Sacerdoti et al. |
| 6,195,681 | B1 | 2/2001 | Appleman et al. |
| 6,195,691 | B1 | 2/2001 | Brown |
| 6,208,336 | B1 | 3/2001 | Carter |
| 6,232,972 | B1 | 5/2001 | Arcuri et al. |
| 6,266,058 | B1 | 7/2001 | Meyer |
| 6,288,753 | B1 | 9/2001 | DeNicola et al. |
| 6,292,185 | B1 | 9/2001 | Ko et al. |
| 6,295,058 | B1 | 9/2001 | Hsu et al. |
| 6,297,819 | B1 | 10/2001 | Furst |
| 6,304,898 | B1 | 10/2001 | Shiigi |
| 6,405,225 | B1 | 6/2002 | Apfel et al. |
| 6,496,203 | B1 | 12/2002 | Beaumont et al. |
| 6,522,333 | B1 | 2/2003 | Hatlelid et al. |
| 6,571,290 | B2 | 5/2003 | Selgas et al. |
| 6,651,087 | B1 | 11/2003 | Dennis |
| 6,747,970 | B1 | 6/2004 | Lamb et al. |
| 6,771,290 | B1 | 8/2004 | Hoyle |
| 6,784,900 | B1 | 8/2004 | Dobronsky et al. |
| 6,819,343 | B1 | 11/2004 | Sobeski et al. |
| 6,931,254 | B1 | 8/2005 | Egner et al. |
| 7,107,548 | B2 * | 9/2006 | Shafron .................. 715/826 |
| 7,159,192 | B2 | 1/2007 | Dobronsky |
| 7,222,303 | B2 | 5/2007 | Oren et al. |
| 2001/0029527 | A1 | 10/2001 | Goshen |
| 2002/0140732 | A1 | 10/2002 | Tveskov |
| 2002/0149611 | A1 | 10/2002 | May |
| 2003/0107593 | A1 | 6/2003 | Domenico |
| 2003/0110450 | A1 | 6/2003 | Sakai |
| 2003/0206200 | A1 | 11/2003 | Hejl |
| 2003/0208543 | A1 | 11/2003 | Enete et al. |
| 2003/0225846 | A1 | 12/2003 | Heikes et al. |
| 2004/0003097 | A1 | 1/2004 | Willis et al. |
| 2004/0041836 | A1 | 3/2004 | Zaner et al. |
| 2004/0215721 | A1 | 10/2004 | Szeto et al. |
| 2004/0221224 | A1 | 11/2004 | Blattner et al. |
| 2004/0268263 | A1 | 12/2004 | Van Dok et al. |
| 2007/0162867 | A1 | 7/2007 | Dobronsky |

FOREIGN PATENT DOCUMENTS

| | | |
|---|---|---|
| WO | WO 01/97121 | 12/2001 |
| WO | WO 02/08852 | 1/2002 |
| WO | WO 02/32032 | 4/2002 |

OTHER PUBLICATIONS

WindowBlinds 0.95 Preview, ActiveWindows. 2 pages, wysiwyg://154/http://www.activewin.com/reviews/wb/95pre/wb95.shtml, [last accessed Feb. 8, 2002].
Leebow's Friday Letter ( http://scout118.cs.wisc.edu/netnews/Jun. 4, 1999/0010.html), 3 pages.
Yahoo!Companion [http ://www.32bit .com/software/listings/Internet/Plugin/ S/10416]; Printed May 14, 2001, 2 pages.
Winamp Skins, Sep. 26, 1998, 9 pages.
Keller, Richard M., et al., "A Bookmarking Service for Organizing and Sharing URLs", Elsevier Science B.V, May 14, 1998, 12 pp.
NeoPlanet Home p., © 1998-2004 NeoPlanet, Inc., 1 page, http://www.neoplanet.com. [last accessed Dec. 27, 2006].
Alexa Homepage and Associated Webpages. http://www.archive.org. Available Dec. 2000 or earlier. Printed Dec. 2006. 23 pages.
Adam Wisniewski, What, me worry? Despite hard financial times, Web innovations could still be found at Internet World 2000; TimeOut Technology, Nov. 9-16, 2000 Issue No. 268; 1-2 pages.
Chris Gonsalves, Hardware news, software updates & services briefs, ZDNet eWEEK Building The E-Business Enterprise, Nov. 13, 2000, 1 thru 4 pages.
CHtmlView, MSDN Oct. 2000, 2 pages.
CSkin, MFC Visual C++ 6.0, Published prior to applicant's file date, 7 pages.
"NeoPlanet steps up support of mozilla.org open source software development", Apr. 18, 1999, 00 :NeoPlanet press, 2 pages.
Chappel D; Linthicum D S: "ActiveX demystified", BYTE (International Edition), Sep. 1997, ISSN 0360-5280, vol. 22, No. 9, pp. 56-62, 64, (XP000726365).
TipWorld: "Tips Internet Explorer: Nov. 1996", p. 1-6, published on Internet, available via site http://www.cc1.jura.uni-sb.de.
TipWorld: "Tips Internet Explorer: Apr. 1998", p. 1-9, published on Internet, available via site http:WWW.cc1.jura.uni-sb.de.
Tim Daniels: "1001 Secrets for Windows NT Registry", Dec. 1997, USA, Internet version, available via Internet at http://www.windowsitlibrary.com. pp. 1-4.
Miah T; Karageorgou M.; Knott R P: "Adaptive Toolbars: An Architectural Overview", $3^{rd}$ ERCIM Workshop on "User Interfaces for All", Obernai, France, Nov. 3-4, 1997, (XP002165773), 7 pages.
Business Wire (Let Yahoo! Companion Be Your Guide; Users Can Now Customize Browser Toolbar to Feature Yahoo! Bookmarks and Services, pp. 1-2, Jun. 29, 1999).
Cluts, Nancy W., "The Rebar Control: Using a Coolbar in Your Application", Microsoft Corporation, Oct. 1, 1996, 19 pp.
Esposito, Dino , "Browser Helper Objects: The Browser the Way You Want It", Microsoft Corporation, Jan. 1, 1999, 10 pp.
Gulesian, Marcia , "Plugging Into the Web", DBMS, Dec. 1, 1996, pp. 69, 70 and 72.
Roberts, Scott , "Take Total Control of Internet Explorer with Advanced Hosting Interfaces", MSDN, Oct. 1, 1998, 8 pp.
Smith, Douglas , "WindowBlinds Preview 0.40; Change Desktops as Easily as You Change Clothes", WinPlanet, Feb. 8, 2002, 2 pp.
Smith, Douglas , "WindowBlinds Preview 0.40; What Are These WindowBlind Things Anyway?", WinPlanet, Feb. 8, 2002, 2 pp.
@ Mail Changelog—Description on new changes to @Mail, @Mail Webmail System, 16 pages. http://support.atmail.com/v3changelog.html, [last accessed May 2, 2005].
Cnet Download.com, Plug-ins, © 2005 CNET Networks Inc., 4 Pages.
Keizer, Gregg, "Put a Little Yahoo in Your Browser—Plug-in puts Yahoo content on your browser's toolbar," Feb. 8, 2001, PCWorld.com, Web Services, 1 page, http://www.pcworld.com/resource/printable/article/0,aid,15179,00.asp [last accessed Sep. 9, 2004].
Internet ScreenDump (Yahoo!Companion, pp. 6), May 14, 2001.
European Office Action, European Patent Office, Application No. 0944199.9, mail date Jul. 29, 2002, 3 pages.
European Office Action, European Patent Office, Application No. 0944199.9, mail date Apr. 25, 2003, 2 pages.
European Office Action, European Patent Office, Application No. 0944199.9, mail date Feb. 7, 2005, 8 pages.
European Office Action, European Patent Office, Application No. 0944199.9, mail date Feb. 8, 2006, 9 pages.
International Search Report, International Patent Application No. PCT/US03/37063, dated Mar. 25, 2004, 1 page.
International Preliminary Examination Report, International Patent Application No. PCT/IL00/00416, dated Sep. 26, 2001, 7 pages.
International Written Opinion, International Patent Application No. PCT/IL00/00416, dated Jul. 11, 2001, 7 pages.
International Search Report, International Patent Application No. PCT/IL00/00416, dated Nov. 15, 2000, 4 pages.
Non-Final Office Action for U.S. Appl. No. 09/373,815 mailed Feb. 13, 2002, 9 pages.
Non-Final Office Action for U.S. Appl. No. 09/373,815 mailed Nov. 7, 2002, 8 pages.
Final Office Action for U.S. Appl. No. 09/373,815 mailed Apr. 21, 2003, 10 pages.

(56) References Cited

OTHER PUBLICATIONS

Non-Final Office Action for U.S. Appl. No. 09/373,815 mailed Jan. 9, 2004, 6 pages.
Non-Final Office Action for U.S. Appl. No. 09/864,551 mailed Mar. 1, 2004, 7 pages.
Final Office Action for U.S. Appl. No. 09/864,551 mailed Sep. 10, 2004, 9 pages.
Non-Final Office Action for U.S. Appl. No. 09/864,551 mailed Jun. 28, 2005, 9 pages.
Non-Final Office Action for U.S. Appl. No. 09/864,551 mailed Dec. 27, 2005, 9 pages.
Final Office Action for U.S. Appl. No. 09/864,551 mailed Jul. 26, 2006, 8 pages.
Non-Final Office Action for U.S. Appl. No. 10/420,625 mailed Oct. 21, 2004, 11 pages.
Final Office Action for U.S. Appl. No. 10/420,625 mailed May 4, 2005, 10 pages.
Non-Final Office Action for U.S. Appl. No. 10/420,625 mailed Sep. 21, 2005, 11 pages.
Non-Final Office Action for U.S. Appl. No. 11/614,430 mailed Jan. 25, 2010, 23 pages.
Non-Final Office Action for U.S. Appl. No. 11/614,430 mailed Aug. 25, 2010, 13 pages.
Final Office Action for U.S. Appl. No. 11/614,430 mailed Mar. 15, 2011, 14 pages.
Notice of Allowance for U.S. Appl. No. 11/614,430 mailed Mar. 30, 2012, 8 pages.

* cited by examiner

SYSTEM AND METHOD FOR THE DYNAMIC IMPROVEMENT OF INTERNET BROWSER NAVIGABILITY

CROSS-REFERENCE TO RELATED APPLICATIONS

This is a continuation application of U.S. patent application Ser. No. 09/864,551, filed 23 May 2001, which is a continuation-in-part of U.S. patent application Ser. No. 09/373,815, filed 13 Aug. 1999, now U.S. Pat. No. 6,784,900, issued on 31 Aug. 2004, titled "SYSTEM AND METHOD FOR THE DYNAMIC IMPROVEMENT OF INTERNET BROWSER APPEARANCE AND CONNECTIVITY," which is commonly assigned with the present invention, and the contents of each of which are hereby incorporated by reference. This application also claims the benefit of Israeli Patent Application No. 130972, filed 15 Jul. 1999.

FIELD OF THE INVENTION

The invention relates to a method for dynamically improving the appearance and performance of Internet browsers, and their connectivity to web sites.

BACKGROUND OF THE INVENTION

In the parent application mentioned above, there is disclosed an invention claiming a method and system by which the Internet Browser, and its standard "toolbar" in particular, is modified in appearance and function through the addition to the standard browser toolbar a custom HotbarToolbar, which may comprise custom "skins" and/or certain custom HotbarToolbar Buttons (hereinafter sometimes referred to as "hotbuttons"); each hotbutton had a name or label, and the depression (clicking) of which caused a pop-up menu of selected website links to appear. In the previous application (the entire contents of which are hereby incorporated by reference), i.e., prior to the method and system according to the current invention, these hotbuttons, once "attached" to the HotbarToolbar, remained there, fixed and static in nature, with their identifying name or label remaining whatever it was chosen to be upon the creation and attachment of the button. Notably, the hotbuttons were essentially "static," in that they did not change when the browser navigated from one website to another.

SUMMARY OF THE INVENTION

The HotbarToolbar comprises a plurality of categorized or related links, which in the presently preferred embodiment are organized under customized, newly and dynamically added toolbar buttons known as hotbuttons. The name and/or content of the hotbuttons may change dynamically in accordance with various factors (including, but not limited to, changes in URL).

DETAILED DESCRIPTION OF PRESENTLY PREFERRED EMBODIMENTS

In accordance with the method and system of the present invention, there are provided means for dynamically selecting one or more customized hotbuttons for incorporation into the HotbarToolbar, the selection of such will change during the use of the browser (as when one navigates from one site to another) and the choice of which may be made according to one or more of a variety of factors. Said means may, for example, be provided in the form of the client computer sending information which information may include, for example, its current location URL to the server, and receiving therefrom a list of the appropriate hotbuttons to be displayed on the HotbarToolbar. The appearance and/or the contents (e.g., links) of a hotbutton might change as a function of one or more factors, such as, for example: the subject of the current web page that the browser is viewing, the skin that is wrapped around the toolbar, the context and/or content of the current web page (including, but not limited to, products displayed on the current web page), desired advertisement, demographic information, geographic information, the behavior of the user, the interests of the user, as well as for other reasons which will be readily apparent to those of ordinary skill in the relevant art.

Figure 1:
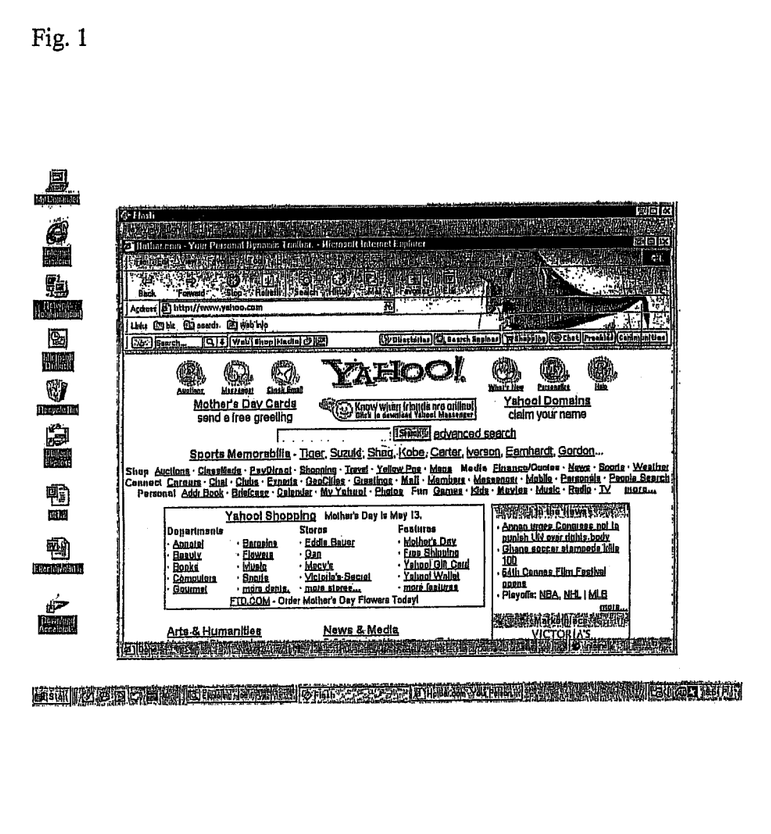
FIG. 1 is a screenshot of a customized browser comprising the method and system according to the present invention, showing the browser's appearance at www.yahoo.com.

Reference is now made to FIG. 1, which shows a customized browser comprising the method and system according to the present invention. Note in FIG. 1 that the browser is shown located at the website www.yahoo.com—a site of general interest. Note in FIG. 1 that, in accordance with the present invention, certain hotbuttons were chosen for incorporation into the HotbarToolbar; these hotbuttons are labeled "Directories," "Search Engines," "Shopping," "Chat," "Freebies" and "Communities". Note further the custom skin; in addition to all its other functions and purposes, its presence is a signal to the surfer that he or she is using a modified (enhanced) browser, and hence the custom skin works cooperatively and synergistically with the other elements of the method and system of the current invention, especially inasmuch as it alerts a user to the presence of the custom hotbuttons.

Figure 2:
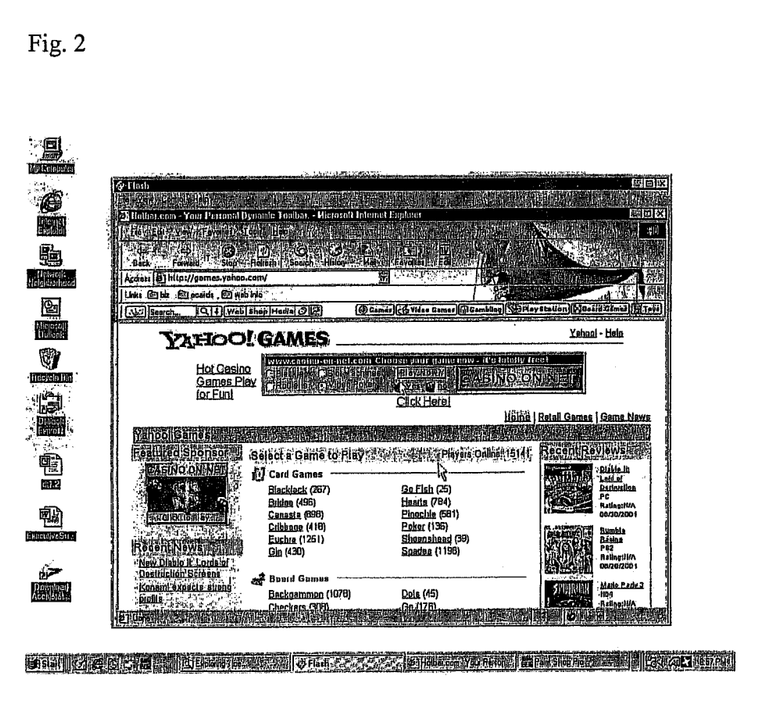
FIG. 2 is a screenshot of a customized browser comprising the method and system according to the present invention, showing the browser's appearance at http://games.yahoo.com with the new hotbuttons.

It is useful to next consider how the selection of hotbuttons changes when the browser is directed to another site. As is well known to those of ordinary skill in the art, entering a new URL, whether manually, via hyperlink, or otherwise will redirect the browser to that new URL. For example, if one enters http://games.yahoo.com into the address window, he or she will be redirected to that page, as depicted in FIG. 2. In accordance with traditional browser operation, browsing to the new address: http://games.yahoo.com, has resulted in the display of new content, i.e., the content of the web page located at that site—in this instance, content relating to games. Also, in accordance with the method and system of the present invention, browsing to the new address http://games.yahoo.com has resulted in the incorporation of new hotbuttons related to said address (e.g., URL, content, etc.).

To better understand and appreciate the method and system according to the present invention, look more closely at FIG. 2 and compare it to FIG. 1. Note that the labels on the hotbuttons have changed from what they were in FIG. 1. Specifically, the hotbuttons labeled "Directories," "Search Engines," "Shopping," "Chat," "Freebies" and "Communities" which had been displayed in the browser located at www.yahoo.com (see FIG. 1), have changed to different hotbuttons, labeled "Games," "Video Games," "Gambling," "Play Station," "Board Games" and "Toys" which are displayed in the browser located at http://games.yahoo.com (see FIG. 2).

Thus, it is readily seen that, in accordance with the method and system according to the present invention, the customized hotbuttons are not static, but dynamic, and change during the operation of the browser according to factors previously discussed. Clicking on a hotbutton may result in various actions; in this example, it yields a list of links related to that hotbutton label (topic). In the instance where one or more hotbuttons are related to a specific product(s) displayed within the web page, the list of links yielded when clicking the hotbutton may also include comparative shopping information related to such product(s).

Note that the hotbuttons displayed on the HotbarToolbar are actually related to the topics, content (including, but not limited to, products) and/or appearance of what is displayed on the screen. This is an important aspect of the present invention. It should be understood that any one or more of a variety of techniques could be used to dynamically select the hotbuttons displayed on the HotbarToolbar at any time. For example, the customized browser constituted and operated in accordance with the present invention might associate the URL to a pre-cataloged directory which defined related hotbutton topics; alternatively, or additionally, the present invention may analyze the content of the page displayed, and, upon finding certain keywords, identify hotbuttons relevant to those keywords; alternatively, or additionally, the customized browser might analyze the IP address underlying the URL to which the customized browser has been directed, and infer therefrom certain demographic information and/or geographic information and/or other information which it might use in assigning the relevant topics to the hotbuttons.

Figure 3:
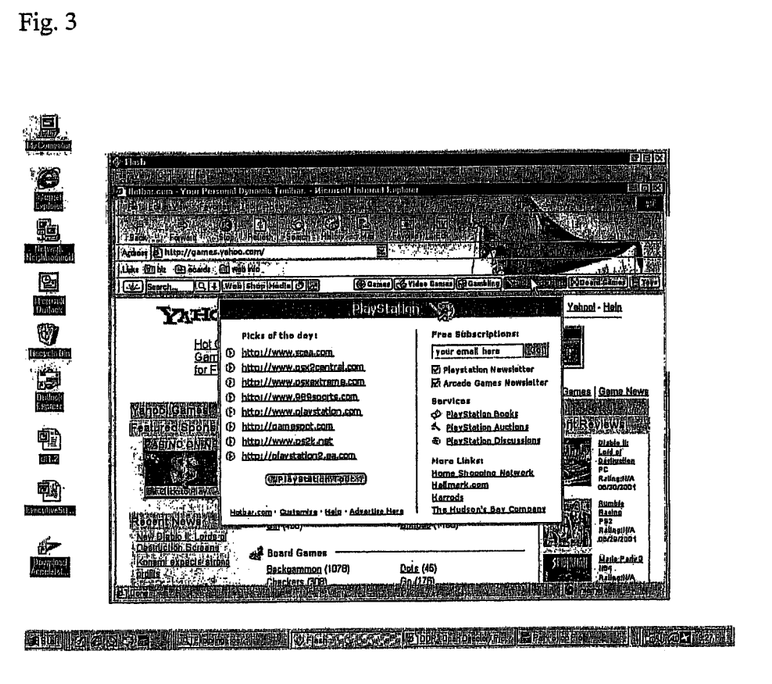
FIG. 3 is a screenshot of a customized browser comprising the method and system according to the present invention, showing the browser's appearance at http://games.yahoo.com after the user has clicked on the Playstation hotbutton as illustrated therein.
Figure 4:
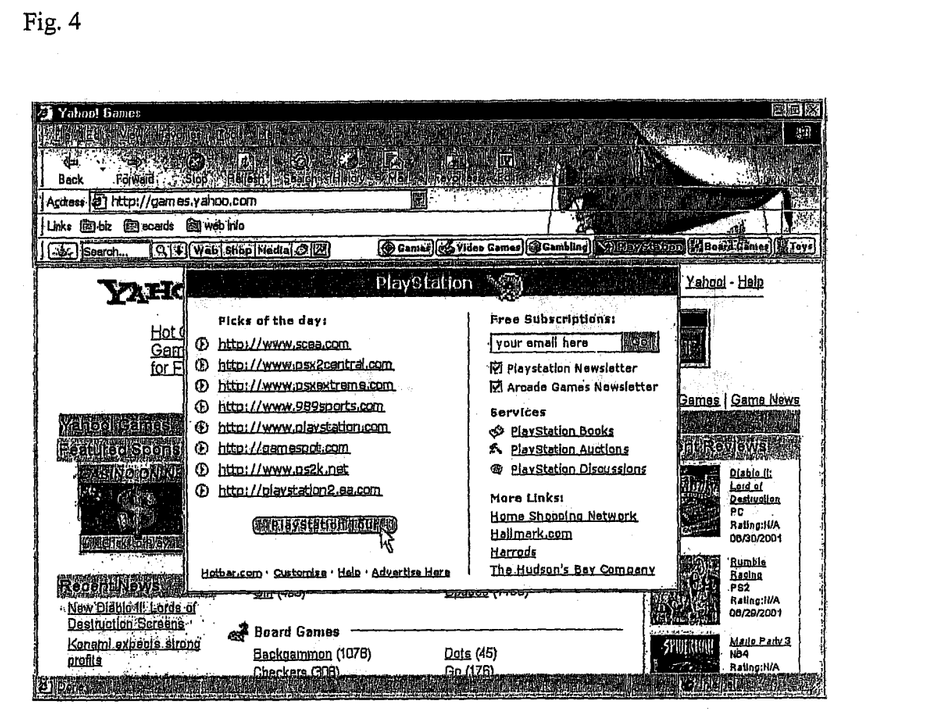
FIG. 4 is a screenshot of a customized browser comprising the method and system according to the present invention, showing that the user can click on the "Playstation Tours" button within the Playstation hotbutton pop-up.
Figure 5:
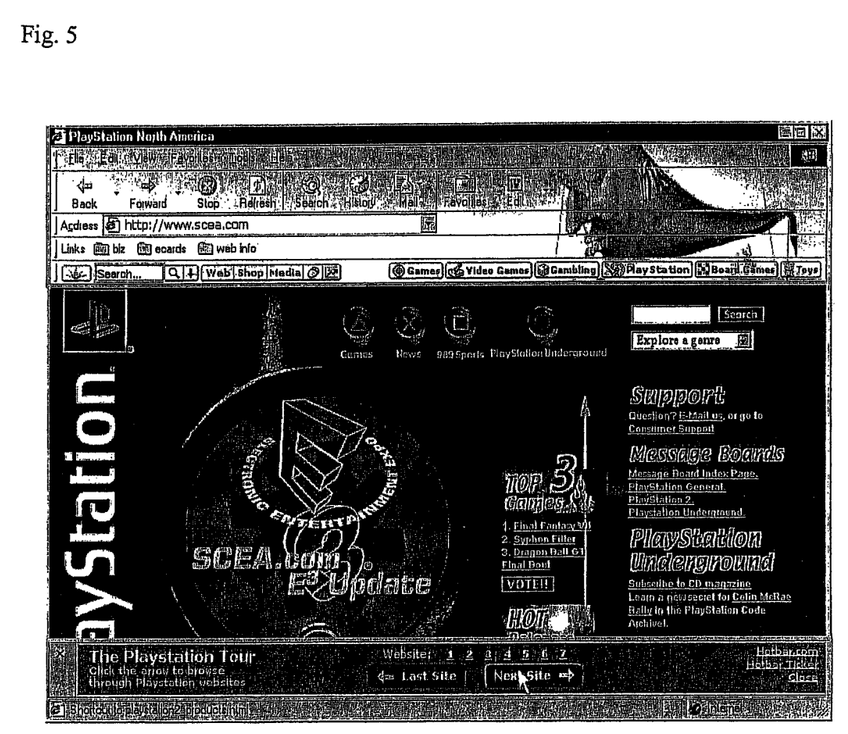
FIG. 5 is a screenshot of a customized browser comprising the method and system according to the present invention, showing that the tour will open in a frame at the bottom border of the screen and the user can step through the "picks of the day" (list of related links which are shown in the Playstation hotbutton pop-up as displayed in FIG. 3) by clicking on the 'Last Site' and 'Next Site' buttons.
Figure 6:
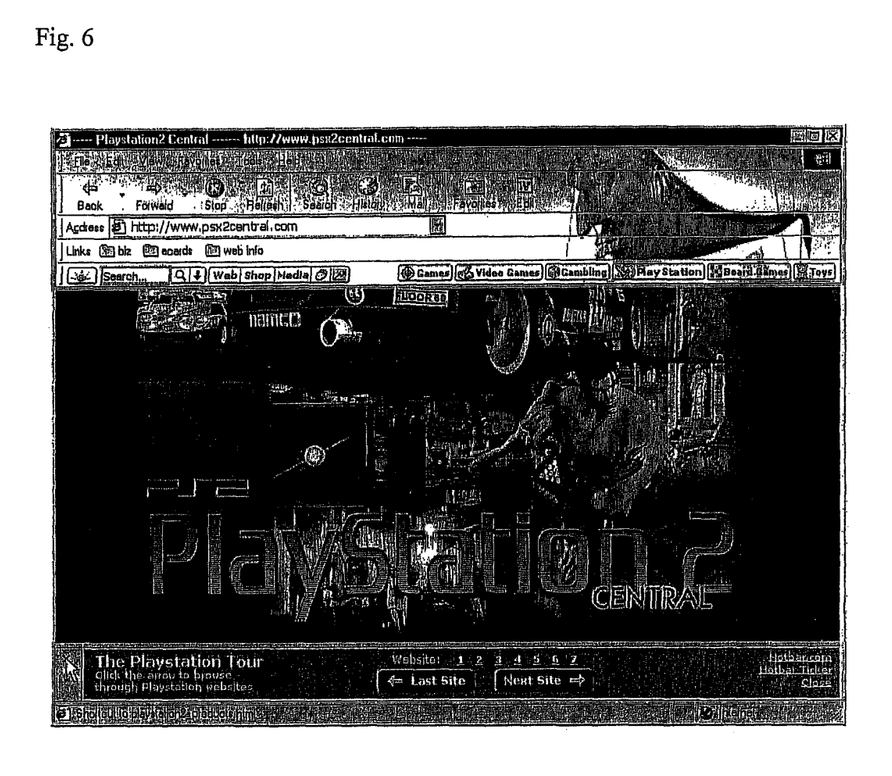
FIG. 6 is a screenshot of a customized browser comprising the method and system according to the present invention, showing that the user is redirected to the next site in the list and can close the Tour by clicking on the X in the top-left corner of the Tour frame.
Figure 7:
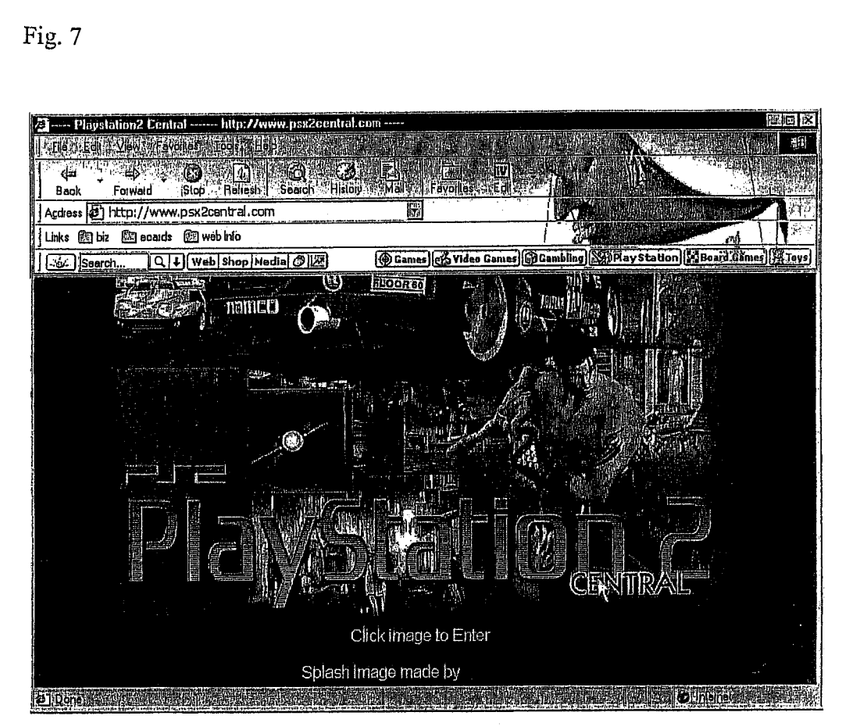
FIG. 7 is a screenshot of a customized browser comprising the method and system according to the present invention, showing that the Tour frame has been closed.

Consider next what happens when a surfer clicks on a hotbutton in this example, e.g., the hotbutton in FIG. 3 that is labeled "PlayStation". FIG. 3 shows the result of such a click—the emergence of a pop-up window (hereinafter sometimes referred to as a "Center") comprising links relating to the title, or topic of that hotbutton.

While embodiments of the invention have been described by way of illustration, it will be understood that the invention can be carried out by persons of ordinary skill in the art with many modifications, variations and adaptations, without departing from the scope of the claims and the legally permissible equivalents thereof.

We claim:

1. A computer-implemented method for presenting graphic and other information in a toolbar area of a browser, the method comprising:
    displaying at least one user-selectable button in the toolbar area of the browser, wherein the at least one user-selectable button includes said graphic information, a text label, or both;
    receiving user input selecting the at least one user-selectable button;
    directing a user to at least one web site related to the graphic information or the text label of the at least one user-selectable button; and
    changing the graphic information or the text label dynamically based on information associated with the user and when the browser navigates from the at least one website to another website.

2. The method of claim 1 wherein the graphic information includes an image.

3. The method of claim 1 wherein the graphic information includes an icon, and the information associated with the user includes demographic information of the user.

4. The method of claim 1, wherein the information associated with the user includes a geographic location of the user, and wherein the information associated with the user includes one or more behaviors of the user, and wherein one of the one or more behaviors includes a behavior of the user while using the browser.

5. The method of claim 1 wherein the information associated with the user includes one or more interests of the user.

6. The method of claim 1 further comprising changing at least the one web site to which the at least one user-selectable button directs the user when the graphic information or the text label is updated.

7. The method of claim 1 further comprising displaying, upon selection of the at least one user-selectable button by the user, a list that includes links to each of any related web sites to which the at least one user-selectable button directs the user.

8. A non-transitory computer-readable medium encoded with processing instructions in an executable format to implement a method for dynamically updating an attribute of a browser, which when performed by a computer, the method comprises:
    providing graphic information, a text label, or both in the browser;
    modifying the graphic information or the text label based on information associated with a user of the browser and when the browser navigates from one website to another website; and
    displaying a user-selectable button in association with the graphic information or the text label, wherein the user-selectable button is configured for directing the user to at least one web site related to the graphic information or the text label, and wherein the user-selectable button is provided via a component installed with the browser.

9. The computer-readable medium of claim 8 wherein the graphic information includes an image.

10. The computer-readable medium of claim 8 wherein the graphic information includes an icon, and wherein the information associated with the user includes demographic information of the user.

11. The computer-readable medium of claim 8 wherein the information associated with the user includes a geographic location of the user.

12. The computer-readable medium of claim 8 wherein the information associated with the user includes one or more behaviors of the user, and wherein one of the one or more behaviors includes a behavior of the user while using the browser.

13. The computer-readable medium of claim 8 further comprises:
   changing at least the one web site to which the user-selectable button directs the user when the graphic information or the text label is modified;
   displaying, upon selection of the user-selectable button by the user, a list that includes links to each of any related web sites to which the user-selectable button directs the user; and
   wherein the information associated with the user includes one or more interests of the user.

14. A method in a client computing device and server environment to provide graphic and other information to a browser's toolbar area of a web surfer, comprising:
   providing a plug-in;
   transmitting said plug-in, which is configured to self install in a browser of said web surfer, said graphic and other information displayed as a skin in the toolbar area of said browser by an operation of a module of said plug in, where said graphic and other information is configured to be displayed on a display screen of the client computing device;
   where said plug-in is configured to cooperate with a server to allow said graphic and other information to be dynamically modified according to selections made by said web surfer through the use of a service website, where the plug-in is configured to be stored in an executable format on a non-transitory computer readable medium; and
   updating said graphic and other information displayed as the skin in the toolbar area of said browser on the display screen of the client computing device based on the selections made by said web surfer.

15. The method according to claim 14, wherein the graphic and other information displayed as the skin in the toolbar area comprises a button, a link, or either of these two that is configured to launch an application, game or other service that can be executed directly from the browser's toolbar area, when the button or the link is activated.

16. The method according to claim 14, wherein the graphic and other information that is dynamically modified comprises an addition to the toolbar area of a button, a link, or either of these two that is configured to launch an application, game or other service that can be executed directly from the browser's toolbar area, when the button or the link is activated.

17. The method according to claim 14, wherein the graphic and other information is provided to the web surfer by a specific web site from the plug-in and wherein said graphic and other information is related to the specific website from which it is being downloaded.

18. A method in a client computing device and server environment to present graphic and other information in a toolbar area of a web browser, the method comprising:
   providing a plug-in for installation in the web browser, where the plug-in is stored in an executable format on a non-transitory computer-readable medium, where the plug-in includes programming instructions for following operations:
   displaying on a display screen of said client computing device a user-selectable button in the toolbar area of the web browser, wherein the user-selectable button includes at least one of graphic information and a text label, where the user-selectable button is configured to direct a user to at least one web site corresponding to the text label; and
   updating the graphic information and the text label dynamically based on the at least one web site that is being accessed via the web browser.

19. The method of claim 18, further comprising:
   updating the text label based on both an attribute of the user of the web browser and the at least one web site being accessed via the web browser.

20. The method of claim 19, wherein said updating the graphic information and the text label further includes updating an appearance of the user-selectable button based on the web site being accessed by the at least one web browser.

21. The method of claim 19, wherein the programming instructions for following operations, further include:
   executing said programming instructions from the plug-in to generate a virtual toolbar for the web browser, independent of a native toolbar of the web browser program, for display within the web browser program on the display screen of the client computing device, where the virtual toolbar includes at least one virtual button for selecting additional content or services available by a service website, and at least a portion of the additional content or services being downloadable from a remote server responsive to a selection of the at least one virtual button, and the at least one virtual button being associated with a category of available content, where a plurality of selectable categories can be selected from.

* * * * *